S. C. HOOD.
ROTARY GRATING MACHINE.
APPLICATION FILED APR. 18, 1916.

1,186,317.

Patented June 6, 1916.
2 SHEETS—SHEET 1.

Samuel C. Hood,
Inventor per Francis G. Caffey,
Attorney

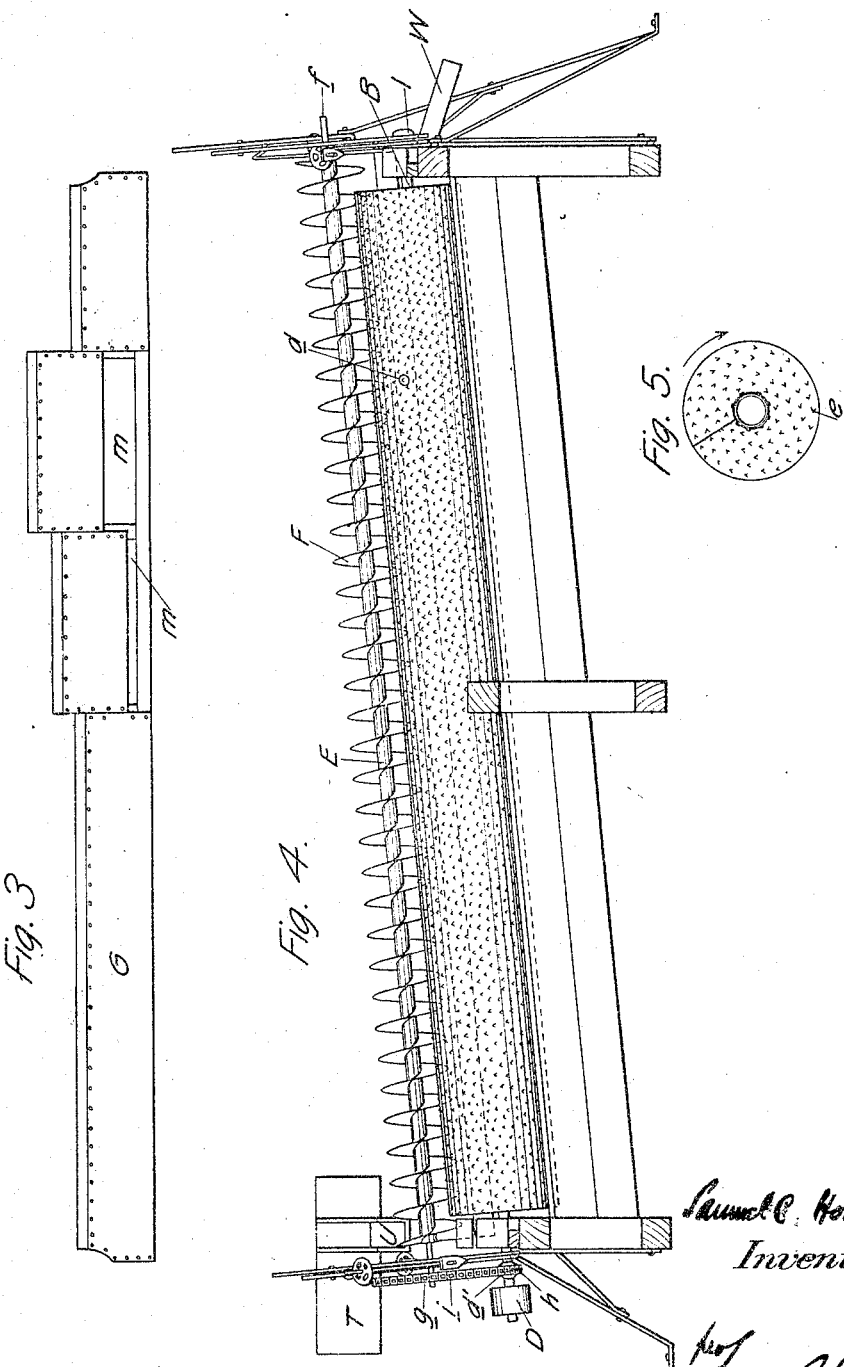

UNITED STATES PATENT OFFICE.

SAMUEL C. HOOD, OF ORLANDO, FLORIDA.

ROTARY GRATING-MACHINE.

1,186,317.  Specification of Letters Patent.  Patented June 6, 1916.

Application filed April 18, 1916. Serial No. 92,060.

(DEDICATED TO THE PUBLIC.)

*To all whom it may concern:*

Be it known that I, SAMUEL C. HOOD, a citizen of the United States of America, and an employee of the Department of Agriculture of the said United States, residing at Orlando, in the county of Orange, State of Florida, (whose post-office address is Orlando, Florida,) have invented a new and useful Improvement in Rotary Grating-Machines.

This application is made under the Act of March 3, 1883, chapter 143 (22 Stat. 625), and the invention herein described and claimed may be used by the Government of the United States, or any of its officers or employees, in the prosecution of work for the Government, or any person in the United States, without payment to me of any royalty thereon.

My invention relates to rotary cutters for grating oranges and other citrus fruit.

The object of my invention is to provide an apparatus, simple in construction and easy of operation, and one which is specially designed conveniently and cleanly to remove peels from citrus fruits without impairing or injuring the fruit, thus making separately available the peels and the fruit for such commercial use as they may be respectively adapted.

Figure 1:
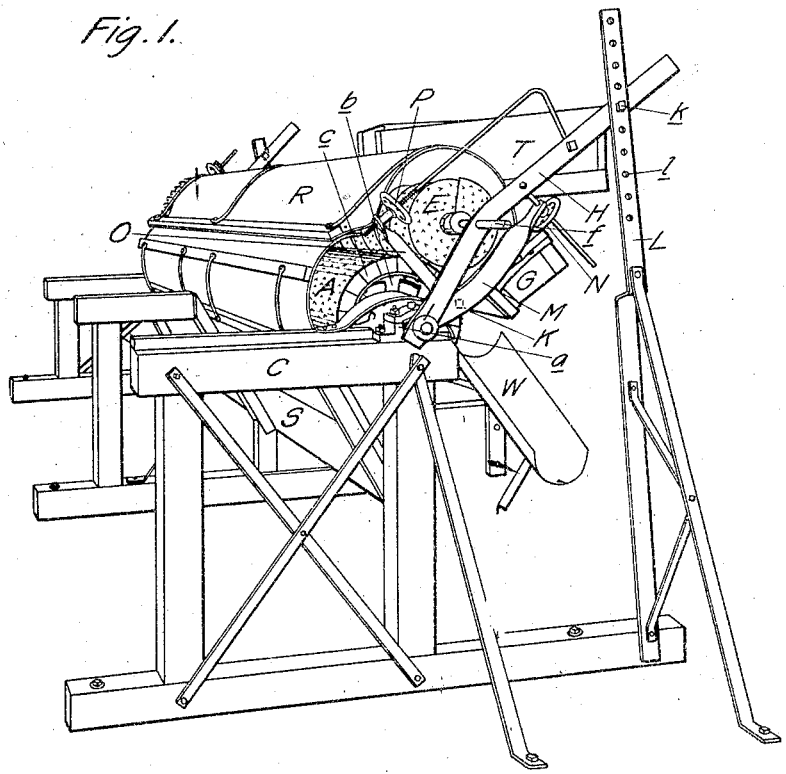
Figure 2:
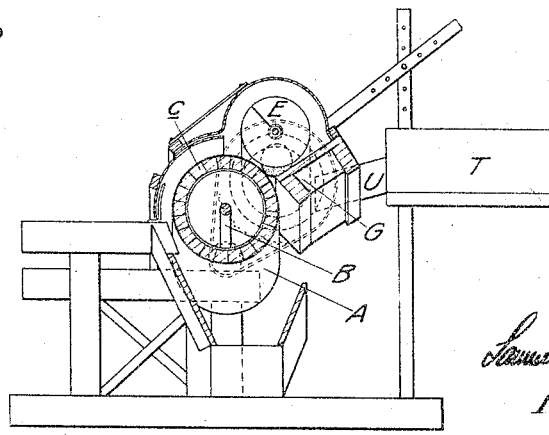

The object, characteristic features, and scope of my invention will be more readily understood from the following description taken in connection with the accompanying drawing, wherein:

Figure 1 is a perspective view of the machine; Fig. 2 is a cross section through the machine; Fig. 3 is a top view of the table; Fig. 4 is a side view of the machine with the cover removed; and Fig. 5 is a cross section of the conveyer.

Referring to the drawings, A represents a cylindrical drum or grating member which is carried or revolved on a shaft, B, resting in suitable bearings, $a$, formed in each of the sides of the base frame work, C. Secured to shaft, B, by any suitable means, and forming part of drum, A, are a number of castings, $b$, spaced at suitable distances. These castings serve to support in its operative position the inner wall of said drum, said inner wall being formed of staves, $c$, preferably cypress.

The outer wall of the drum, A, is made of strips of galvanized iron or other suitable substances completely wound around the inner wall of said drum. These strips are punched so as to form a series of special teeth, $d$. Said teeth, $d$, may be made by a triangular punch, and adjusted so that the teeth are about one-fourth inch long and a point of the teeth raised about one-eighth inch above the surface of said drum. All of the teeth have the points forward. The drum, A, when adjusted and constructed on shaft, B, as described, is set on said framework, C, the framework being well built, braced, and fastened to the floor or other suitable base. One end of the shaft B, when adjusted to the frame-work, C, is approximately twelve inches higher than the other end. Power is applied to shaft B through the medium of the pulley D, which may be belted to any source of supply. A sprocket wheel, $d'$, is fastened to the end of shaft, B, and is of such diameter that when in operation it will serve to revolve the drum at 500 revolutions per minute, and at a relative speed of 4 to 1 revolution of the screw hereinafter described.

E represents a feed screw, constructed preferably of galvanized iron pipe, having securely attached thereto a spiral, F, each flight thereof being about 3½ inches high and spaced approximately 4 inches apart. These flights are punched thickly to form points, $e$, as shown in Fig. 5, about one-eighth inch high on the forward face, and are so formed that their outer edges are set forward about 15 degrees. Screw, E, is riveted or otherwise securely attached to a shaft, $f$, which is set in suitable bearings, forming a part of the adjustable member hereinafter referred to and extends longitudinally and in an inclined position with the drum. Shaft, $f$, is provided at its lower end with a sprocket wheel, $g$, the number of the sprockets being about four to each one of the sprockets, $h$, on the main shaft of the drum, A. The sprockets, $g$ and $h$, are connected by an endless chain, $i$, which makes about one revolution of the screw to four revolutions of the drum as hereinbefore mentioned.

An important element of my device is a specially designed adjustable member for regulating and controlling the feeding operation. This member comprises a table, G, and levers, H, which employ the sleeve, I, as an axis in their turning movements. Table, G, is of the same length as the screw, E, and is secured in operative position beneath said screw. The top of the table consists of a board, having a covering of galvanized iron thickly punched to form points as on the face of the screw flights. The bolt, K, connected to the appropriate member, hereinafter referred to, carries the entire weight of the table, the said bolt serving as a pinion, and on this pinion the table is tilted, raised and lowered as hereinafter described. The free ends of the levers, H, can be raised or lowered on the floor standards, L, by removing and inserting the supporting bolt, $k$, in any of the apertures, $l$, in the floor standards. These standards are braced to withstand the side thrust caused by the feed screw, E, being higher at one end than the other. The shaft, $f$, of the feed screw passes through the levers, H, at the proper point so that the edge of the flights of the feed screw will be about three-fourth inches from the face of the drum.

The lever, M, is supported at one end by the sleeve, I, and at the other end by the wheel screw, N. The lever, O, is supported at one end by the wheel screw, P, secured to and extending from the lever, H, and at the other end by the bolt, K, the latter supporting the table as hereinbefore described. By adjusting the levers, H, on the standards, L, and using the sleeve, I, as an axis, the entire feeding mechanism can be raised or lowered, thus adjusting the weight of the fruit against the drum at the desired pressure. The wheel screws, N, and P, serve as a fine adjustment. The screw, N, changes the angle at which the orange rests against the drum, and by the screw, P, the table is raised or lowered so that the feed screw can be made to run as close as possible to the top of the table. The fine adjustments are necessary for working successfully with various kinds of fruits. The adjustment mechanism is the same at each end of the machine.

The table, G, is provided with openings, $m$, which may be closed by the slidable parts, $m'$, as shown in Fig. 3. These slidable parts may be removed, thus allowing the fruit to drop through the apertures, $m$. The apertures, $m$, are cut in the table, G, to prevent excessive peeling of tender fruit.

Over the machine is a detachable galvanized iron cover, R, and under the drum, A, is adjusted a trough, S, for receiving the peels. Secured in the rear of the device is a bin, T, for holding the fruit. The fruit is fed from said bin into the feed screw, E, through the spout, U, when the peeled fruit is delivered through the spout, W, to any suitable receptacle or container.

In practising my invention, I run the fruit from the storage bin, T, through the spout, U, into the feed screw, E. The feed screw and drum are revolved by means of the sprocket wheels and pulley hereinbefore described. At each revolution of the screw an orange, or other fruit, is admitted. The fruit is carried by this screw the length of the machine and in contact with the grating drum. The peel is removed by the grating process. According as to whether the fruit is tender or tough, the machine can be lowered or raised by the lever, H. The higher the lever, H, is raised, the more the fruit is grated with a consequent less amount of grating as the lever, H, is lowered. The screws, N and P, might be called a fine adjustment so as to exactly regulate the amount of grating on the fruit. This series of levers comprise the adjustable member so as properly to peel the fruit and not destroy it by overgrating. If these levers cannot reduce the amount of grating sufficiently, the fruit can be allowed to drop through the apertures, $m$, and thus not come in contact with the grating surface the entire length of the drum.

The fruit thus peeled is commercially valuable for use in marmalades and other juice preparations to be used at soda fountains, in restaurants, and the home. The machine, however, was designed primarily for the purpose of removing the oil bearing portion of the rind of waste or cull oranges. It is hoped in this way to produce at home the 100,000 pounds of orange oil now imported annually from Italy. Grape fruit and limes can also be profitably peeled by this machine.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having described my invention, I claim:

1. A grating machine comprising a longitudinally disposed movable grating member adapted to support, rotate and guide articles to be grated, a longitudinally disposed supporting and guiding member extending along the side of said grating member and adapted to guide articles toward said grating member and also longitudinally thereof and means operative to control the speed of movement of the article longitudinally and in contact with said member.

2. A grating machine comprising a longitudinally disposed movable grating member adapted to support, rotate and guide articles to be grated, an angularly adjustable longitudinally disposed supporting and guiding member extending along the side of said grating member and adapted to guide articles toward said grating member and also longitudinally thereof and means operative to control the speed of movement of the articles longitudinally and in contact with said member.

3. A grating machine comprising a longitudinally disposed rotary cylindrical grating member adapted to support, rotate and guide articles to be grated, a longitudinally disposed supporting and guiding member extending along the side of said grating member and adapted to guide articles toward said grating member and also longitudinally thereof and means operative to control the speed of movement of the articles longitudinally and in contact with said member.

4. A grating machine comprising a longitudinally disposed rotary cylindrical grating member adapted to support, rotate and guide articles to be grated, an angularly adjustable, longitudinally disposed supporting and guiding member, extending along the side of said grating member and adapted to guide articles toward said grating member and also longitudinally thereof and means operative to control the speed of movement of the articles longitudinally, and in contact with said member.

5. A grating machine, comprising a longitudinally disposed, movable, grating member adapted to support, rotate and guide articles to be grated, a longitudinally disposed supporting and guiding member extending along the side of said grating member and adapted to guide articles toward said grating member, and also longitudinally thereof, and a conveyer disposed above said members and operative to control the speed of movement of the articles longitudinally and in contact with said member.

6. A grating machine comprising article supporting and grating means adapted to support and guide articles freely along a given path of movement and controlling means for regulating the movement of said articles along, and in contact with, said supporting and grating means.

In testimony whereof, I affix my signature in the presence of two subscribing witnesses.

SAMUEL C. HOOD.

Witnesses:
E. B. BRADLEY,
C. KENNISON.